(12) United States Patent
Singh et al.

(10) Patent No.: US 8,744,346 B2
(45) Date of Patent: *Jun. 3, 2014

(54) METHOD AND SYSTEM FOR IMPROVING THE SPECTRAL EFFICIENCY OF A DATA COMMUNICATION LINK

(75) Inventors: Rajendra Singh, Alexandria, VA (US); George Ron Olexa, Gainesville, VA (US)

(73) Assignee: Telcom Ventures, LLC, Alexandria, VA (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/437,626

(22) Filed: Apr. 2, 2012

(65) Prior Publication Data

US 2012/0190297 A1    Jul. 26, 2012

Related U.S. Application Data

(63) Continuation of application No. 12/037,475, filed on Feb. 26, 2008, now Pat. No. 8,165,578.

(60) Provisional application No. 60/908,289, filed on Mar. 27, 2007.

(51) Int. Cl.
*H04B 7/185* (2006.01)
(52) U.S. Cl.
USPC ............... 455/13.1; 455/454; 455/507
(58) Field of Classification Search
USPC ............... 455/11.1–13.4, 427–431, 446, 454, 455/500, 507
See application file for complete search history.

(56) References Cited

U.S. PATENT DOCUMENTS

| | | | |
|---|---|---|---|
| 3,742,498 A | 6/1973 | Dunn | |
| 4,599,647 A | 7/1986 | George et al. | |
| 5,388,101 A * | 2/1995 | Dinkins | 725/62 |
| 5,444,697 A | 8/1995 | Leung et al. | |
| 5,535,432 A | 7/1996 | Dent | |
| 5,584,046 A | 12/1996 | Martinez et al. | |
| 5,713,075 A | 1/1998 | Threadgill | |
| 5,717,830 A | 2/1998 | Sigler | |
| 5,842,125 A | 11/1998 | Modzelesky | |
| 5,850,415 A | 12/1998 | Hunsinger | |
| 5,864,579 A | 1/1999 | Briskman | |
| 5,913,164 A | 6/1999 | Pawa | |

(Continued)

FOREIGN PATENT DOCUMENTS

| | | |
|---|---|---|
| JP | 10-075263 | 3/1998 |
| JP | 2000-101502 | 4/2000 |

(Continued)

OTHER PUBLICATIONS

Chinese Office Action issued in CN 200880010196.5 on Nov. 8, 2012.

(Continued)

*Primary Examiner* — Sharad Rampuria
(74) *Attorney, Agent, or Firm* — DLA Piper LLP (US)

(57) ABSTRACT

An apparatus for communicating between a mobile device, and a plurality of transceivers. The apparatus includes a first transceiver which transmits to the mobile device on any one of a plurality of channels. The apparatus further includes a second transceiver which transmits to the mobile device on any one of the plurality of channels.

30 Claims, 4 Drawing Sheets

(56) References Cited

U.S. PATENT DOCUMENTS

| | | | |
|---|---|---|---|
| 6,014,548 | A | 1/2000 | Balachandran |
| 6,112,083 | A | 8/2000 | Sweet |
| 6,188,873 | B1* | 2/2001 | Wickman et al. ............ 455/11.1 |
| 6,301,313 | B1 | 10/2001 | Gevargiz |
| 6,477,370 | B1* | 11/2002 | Sigler et al. .................. 455/427 |
| 6,522,644 | B2 | 2/2003 | Bergkvist |
| 6,539,004 | B1 | 3/2003 | Sawyer |
| 6,757,546 | B1 | 6/2004 | Hagen |
| 6,823,169 | B2 | 11/2004 | Marko |
| 6,892,068 | B2 | 5/2005 | Karabinis et al. |
| 7,113,778 | B2 | 9/2006 | Karabinis |
| 7,149,526 | B2 | 12/2006 | Karabinis et al. |
| 7,286,624 | B2 | 10/2007 | Woo |
| 7,813,700 | B2 | 10/2010 | Zheng |
| 8,131,403 | B2* | 3/2012 | Forbes et al. ................. 700/295 |
| 8,374,601 | B2* | 2/2013 | Sadok et al. .................. 455/431 |
| 2001/0038674 | A1 | 11/2001 | Trans |
| 2002/0012381 | A1 | 1/2002 | Mattisson et al. |
| 2002/0177465 | A1 | 11/2002 | Robinett |
| 2004/0072539 | A1 | 4/2004 | Monte et al. |
| 2004/0192201 | A1 | 9/2004 | Febvre |
| 2004/0198312 | A1 | 10/2004 | Jarett |
| 2005/0031045 | A1 | 2/2005 | Mayor et al. |
| 2005/0164701 | A1 | 7/2005 | Karabinis et al. |
| 2005/0176379 | A1 | 8/2005 | Grindahl et al. |
| 2006/0111041 | A1 | 5/2006 | Karabinis |
| 2006/0135070 | A1 | 6/2006 | Karabinis |
| 2006/0205367 | A1 | 9/2006 | Karabinis |
| 2007/0037514 | A1 | 2/2007 | Karabinis |
| 2008/0242330 | A1 | 10/2008 | Singh |

FOREIGN PATENT DOCUMENTS

| | | |
|---|---|---|
| JP | 2001-514811 | 9/2001 |
| JP | 2002-084261 | 3/2002 |
| JP | 2003-032207 | 1/2003 |
| JP | 2003-333012 | 11/2003 |
| RU | 2189113 | 9/2002 |
| WO | WO 99/03213 | 1/1999 |
| WO | WO 01/89102 | 11/2001 |
| WO | WO 02/091631 | 11/2002 |
| WO | WO 2004/100501 | 11/2004 |
| WO | WO 2005/101693 | 10/2005 |

OTHER PUBLICATIONS

English Language Summary of Chinese Office Action issued in CN 200880010196.5 on Nov. 8, 2012.
English Language Translation of CN 200880004987.7 issued on Dec. 5, 2012.
U.S. Appl. No. 12/508,942.
U.S. Appl. No. 12/053,000.
Chinese Office Action issued in 200880004987.7 on Jun. 8, 2013.
English language translation of Chinese Office Action issued in 200880004987.7 on Jun. 8, 2013.
U.S. Appl. 12/508,942.
Decision of Grant issued in RU 2009-139648 on Jun. 26, 2012.
English Translation of Decision of Grant issued in RU 2009-139648 on Jun. 26, 2012.
English Language Abstract of RU 2189113 published Sep. 2, 2002.
Official Letter of Inquiry mailed in JP 2008-549524 on Aug. 21, 2012.
English Language Translation of the Official Letter of Inquiry mailed in JP 2008-549524 on Aug. 21, 2012.
English Language Abstract of JP 2001-514811 published Sep. 11, 2001.
English Language Translation of JP 2001-514811 published Sep. 11, 2001.
English Language Abstract of JP 10-075263 published Mar. 17, 1998.
English Language Translation of JP 10-075263 published Mar. 17, 1998.
English Language Abstract of JP 2000-101502 published Apr. 7, 2000.
English Language Translation of JP 2000-101502 published Apr. 7, 2000.
International Search Report Issued in related International Application No. PCT/US06/62566, mailed Sep. 26, 2007.
Israfil Bahceci et al., Presentation: Diversity Comvining for Fading Channels, 13 pages, Nov. 23, 2004.
Michael W. Thelander, "WIMAX or WIBRO: Similar Names, Yet Dissimilar Technologies", Signal Resarch Group, Apr. 2006.
Kari Pietikainen, "Orthogonal Frequency Division Multiplexing", http://www.comlab.hut.fi/opetus/333/lectures.html, pp. 1-5. Feb. 22, 2005.
"Orthogonal Frequency-Division Multiplexing", http://en.wikipedia.org./w/index.php?title=Orthogonal_frequency-division_multiplexing&pri . . . , 7 pages, printed Jan. 3, 2006.
"806.16E: IEEE Standard for Local and Metropolitan Area Networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1", IEEE Computer Society and IEEE Microwave Theory and Techniques Society, pp. iv-xxxix and 1-51, Feb. 28, 2006.
Internation Search Report issued in Application No. PCT/US08/057818 mailed Jun. 26, 2008.
Written Opinion issued in Application No. PCT/US08/057818 mailed Jun. 26, 2008.
Internation Search Report issued in Application No. PCT/US08/054985 mailed Jun. 27, 2008.
Written Opinion issued in Application No. PCT/US08/054985 mailed Jun. 27, 2008.
International Search Report issued in Application No. PCT/US06/025268 mailed Oct. 14, 2008.
Written Opinion issued in Application No. PCT/US06/025268 mailed Oct. 14, 2008.
International Preliminary Report on Patentability issued in Application No. PCT/US06/025268 mailed Dec. 11, 2008.
U.S. Appl. No. 11/615,412.
U.S. Appl. No. 11/262,975.
U.S. Appl. No. 12/037,475.
Office Action issued in Russian Appl 2008131934 on Jun. 23, 2010.
English Translation of Office Action issued in Russian Appl 2008131934 on Jun. 23, 2010.
Response filed in Russian Appl 2008131934 to Office Action dated Jul. 23, 2010.
"Frequency Division Multiple Access" Definition; McGraw-Hill Dictionary of Scientific and Technical Terms; Sixth Edition: 2003; p. 854.
English Translation of Office Action issued in Chinese Application 200680050379 on Dec. 14, 2010.
Supplemental Search Report issued in EP 08744178 on Mar. 31, 2011.
English Translation of Office Action issued in Chinese Appl 200680024897.5 on May 25, 2011.
English Translation of Office Action issued in Chinese Appl 200680080379.0 on Jun. 22, 2011.
Li Shihe; TD-SCDMA Third Generation Mobile Communication System Standard; the People's Posts and Telecommunications Press; pp. 73 (Partial English Translation).
Li Fangwei; Mobile Communication Principle and System; the South West Normal University Press; pp. 10 (Partial English Translation).
Japanese Office Action issued in JP2008-549524 on Jul. 22, 2011.
English Language Translation of Japanese Office Action issued in JP2008-549524 on Jul. 22, 2011.
English Language Abstract of JP 2002-084261 published on Mar. 22, 2002.
English Language Translation of JP 2002-084261 published on Mar. 22, 2002.
English Languange Abstract of JP 2003-032207 published Jan. 31, 2003.
English Language Translation of JP 2003-032207 published Jan. 31, 2003.

(56) References Cited

OTHER PUBLICATIONS

English Language Abstract of JP 2003-333012 published Nov. 21, 2003.
English Language Translation of JP 2003-333012 published Nov. 21, 2003.
Russian Office Action issued in 2009137370 on Oct. 19, 2011.
English Language Translation of Russian Office Action issued in 2009137370 on Oct. 19, 2011.
Japanese Office Action issued in JP 2008-549524 on Nov. 15, 2011.
English Language Translation of Japanese Office Action issued in JP 2008-549524 on Nov. 15, 2011.
Supplementary European Search Report issued in EP 06785792 on Dec. 13, 2011.
Russian Office Action issued in RU 2009139648 on Mar. 20, 2012.
English Language Translation of Russian Office Action issued in RU 2009139648 on Mar. 20, 2012.
Chinese Office Action issued in CN 200880010196.5 on Feb. 22, 2012.
English translation of Chinese Office Action issued in CN 200880010196.5 on Feb. 22, 2012.
Chinese Office Action issued in CN 200880004987.7 on Mar. 1, 2012.
English Language Translation of Chinese Office Action issued in CN 200880004987.7 on Mar. 1, 2012.
English Language Translation of Japanese Office Action issued in JP 2010-501035 on Mar. 21, 2012.
Chinese Office Action issued in 200880010196.5 on Jul. 9, 2013.
Partial English language translation of Chinese Office Action issued in 200880010196.5 on Jul 9, 2013.
English Language Translation of Chinese Office Action issued in CN 20088004987.7 dated Jan. 16, 2014.
U.S. Appl. No. 13/767,560.

* cited by examiner

METHOD AND SYSTEM FOR IMPROVING THE SPECTRAL EFFICIENCY OF A DATA COMMUNICATION LINK

CROSS-REFERENCE TO RELATED APPLICATIONS

This application is a Continuation of U.S. application Ser. No. 12/037,475 filed Feb. 26, 2008. U.S. application Ser. No. 12/037,475 is based on and derives the benefit of the filing date of the U.S. Provisional Patent Application No. 60/908,289, filed on Mar. 27, 2007. The entirety of all of the above-listed Applications are incorporated herein by reference.

FIELD OF THE INVENTION

Methods and apparatuses consistent with the present invention relate to communications by a mobile device with a plurality of transceivers, and more particularly, to reusing channels to improve spectral efficiency.

BRIEF DESCRIPTION OF THE DRAWINGS

Detail embodiments of the present invention will be described with reference to the attached drawings, in which.

DETAILED DESCRIPTION OF SEVERAL EMBODIMENTS

Embodiments of the present invention will be described in detail with reference to the accompanying drawings.

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

The present invention may be embodied in many different forms and should not be construed as being limited to the embodiments set forth herein, and are defined by the appended claims. Like reference numerals refer to like elements throughout the specification.

Figure 1:
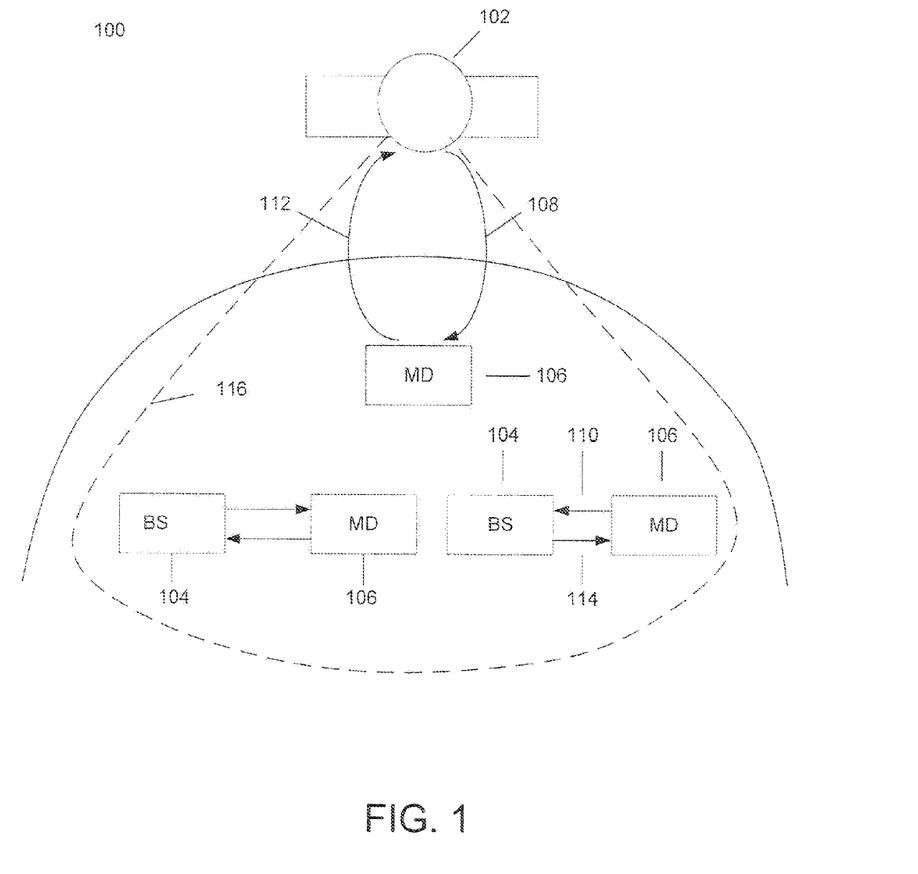
FIG. 1 illustrates a mobile satellite communication system according to an embodiment of the present invention.

FIG. 1 illustrates a mobile satellite communication system 100 with multiple communication devices interacting with each other according to an embodiment of the present invention.

As shown in FIG. 1, a satellite transceiver 102 can communicate bi-directionally with multiple mobile devices 106. Likewise, a terrestrial base station 104 can communicate bi-directionally with multiple mobile devices 106. In this embodiment, a mobile device 106 may include a cellular mobile phone, a personal digital assistant (PDA), or any mobile device that is capable of communicating data to other objects.

The satellite transceiver 102 may include any object that is capable of orbiting another object and capable of communicating data bi-directionally with other objects.

A base station 104 may include any station with a radio transceiver that maintains communications with a mobile radio device within a given range.

According to an embodiment of the present invention, there are four different communication links to be discussed. In the satellite-to-earth communication link 108, a satellite transceiver 102 may transmit data to a mobile device 106. Here, the satellite-to-earth communication may be a part of the Mobile Satellite System (MSS) communication standard. In one embodiment, the satellite transceiver 102 may transmit and receive data to and from an area illuminated by a spot beam 116 that encompasses a mobile device 106. In an earth-to-satellite communication link 112, a mobile device 106 may transmit data to a satellite transceiver 102. In a base station-to-mobile device communication link 114, a base station 104 may transmit data to a mobile device 106. In a mobile device-to-base station communication link 110, a mobile device 106 may transmit data to a base station 104.

Figure 2A:
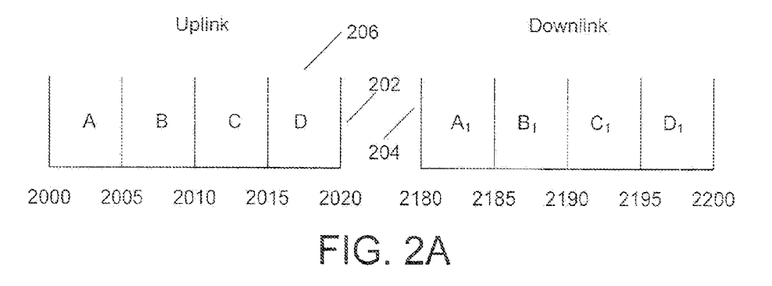
FIG. 2A illustrates an allocation of channels in a spot beam.

The satellite transceiver 102 may transmit data over multiple channels. Each channel can have an assigned frequency. According to an embodiment of the present invention, a satellite transceiver 102 can transmit over any of the four channels labeled $A_1, B_1, C_1, D_1$, respectively, as shown in FIG. 2A. Of course, any number of channels can be provided. Mobile device 106 can transmit to satellite transceiver 102 over multiple channels. Each channel can have an assigned frequency. According to an embodiment of present invention, the mobile device 106 can transmit over any of four channels labeled A, B, C, D, corresponding to channels $A_1, B_1, C_1, D_1$, respectively.

In one embodiment, the communication from the satellite transceiver 102 will be over one of those channels, for example, channel $A_1$. The mobile device 106 will transmit over corresponding channel A. Within the spot beam 116 of satellite transceiver 102, base stations 104 will also be communicating with mobile devices 106. Typically, the frequencies used to communicate between base stations 104 and mobile devices 106 are different from the frequencies used to communicate between satellite transceiver 102 and mobile devices 106. Alternatively, the conventional MSS/ATC standard provides that channels reserved for satellite communications, but unused by the satellite transceiver 102, can be used for base station to mobile device communications within the spot beam 116 of the satellite transceiver 102. Thus, the other channels, in this example, channels $B_1, C_1$ and $D_1$ can be used for base station to mobile device communications, for example as Auxiliary Terrestrial Component (ATC) channels. In accordance with MSS standard. FIG. 2A provides a plurality of channels used in these data transmissions. The satellite-to-earth communication link will be referred to as a MSS communication downlink and the earth-to-satellite communication link will be referred to as a MSS communication uplink.

In the uplink data transmission, in the embodiment illustrated, there are four possible channels labeled A, B, C and D, respectively, as depicted in FIG. 2A. Uplink channel A is associated to downlink channel $A_1$ mentioned above. That is, channels A and $A_1$ form a channel pair. In other words, downlink channel $A_1$ refers to the half of the channel used for sending data from a satellite to a terrestrial device on the earth. Uplink channel A, on the other hand, refers the other half of the channel for sending data from a terrestrial device to the satellite 102. Similarly, this is the case for the remaining channel pairs $B/B_1$, $C/C_1$, and $D/D_1$, where B, C and D correspond to the uplink channels and $B_1$, $C_1$ and $D_1$ correspond to the downlink channels.

In the example shown in FIG. 2A, the frequency spectrum from 2000 to 2020 MHZ may be used for conventional MSS communication uplinks 202 and the frequency spectrum from 2180 to 2200 MHZ may be used for MSS communication downlinks 204. In this example, four 5 MHZ wide channels are used as the communication uplink and downlink channels.

Figure 2B:
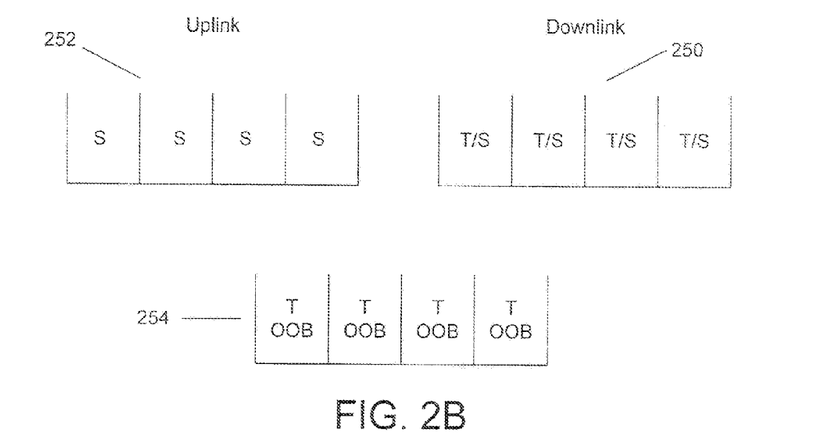
FIG. 2B illustrates an allocation of channels in a spot beam with the addition of a plurality of out of band channels, according to an embodiment of the present invention.

FIG. 2B illustrates an allocation of channels in a spot beam with the addition of a plurality of out of band channels, according to an embodiment of the present invention. As shown in FIG. 2B, there are a plurality of dual downlink T/S channels 250 used for communication from satellite to mobile device (downlink S channels) and from base station to mobile device (downlink T channels). The notation T and S is used to generally indicate terrestrial (T) based communication, such as a communication between the base station and the mobile device and a satellite (S) based communication, such as a communication between the mobile device and satellite. For example, in one embodiment, the one or more terrestrial (T) channels can be ATC channels and one or more of the satellite (S) channels can be MSS channels, although this system can be used apart from a MSS/ATC system. The T/S dual downlink channels 250 allow both the satellite transceiver 102 and base stations 104 to communicate to mobile device 106 on each of the plurality of channels 250. The satellite transmission will not interfere with the base station transmission on the same frequency because the base station signal is order of magnitude stronger than the satellite signal in the coverage area of the spot beam transmission from the satellite transceiver 102. The downlink S channels in the T/S dual downlink channels 250 (i.e., satellite to mobile device downlink channels) are paired with the uplink S channels 252 (i.e., mobile device to satellite uplink channels).

The uplink channels (i.e., mobile device to base station channels) corresponding to the downlink T channels (i.e., base station to mobile device channels) in the T/S dual downlink channels 250 are handled differently. As shown in FIG. 2B, a plurality of terrestrial out-of-band uplink channels (T OOB) 254 are added to the uplink S channels (i.e., mobile device to satellite uplink channels). The T OOB channels 254 allow a mobile device 106 to communicate with a base station 104 without interfering with reception by the satellite transceiver 102. Each terrestrial out-of-band channel (T OOB channel) in the plurality of uplink T OOB channels 254 together with each of the plurality of downlink T channels in the plurality of dual T/S downlink channels 250 form a terrestrial channel pair permitting communications between a base station and a mobile device. In the embodiment illustrated in FIG. 2B, the OOB spectrum portion is comprised of four OOB uplink channels and each of the four OOB uplink channels is paired with a respective channel in four downlink T channels. However, it must be appreciated that any number of channels can be implemented, as desired.

Each uplink T OOB channel in the T OOB channels 254 can be used along with a corresponding downlink T channel in the plurality of dual T/S downlink channels 250 for terrestrial transmission within a coverage area of a spot beam from a satellite transceiver. The uplink T OOB spectrum may include any spectrum with adequate propagation characteristics for mobile or portable use.

Interference is mitigated because the uplink T OOB channel is not seen by the satellite transceiver 102. The uplink T OOB channels 254 are out of the satellite transceiver band pass.

By pairing T OOB uplink (mobile device to base station) spectrum with terrestrial T downlink spectrum in the dual T/S downlink spectrum (at the satellite downlink frequency) in the manner described above, there is substantially no uplink interference posed to any satellite transceiver operating in the normal satellite uplink band. The satellite transceiver "sees" only energy associated with desired uplink earth to space communications. Any energy associated with the uplink to terrestrial base stations is removed to another band of frequencies outside the satellite uplink spectrum that cause substantially no interference to the satellite transceiver.

In areas where the satellite is the only service provider, the uplink from the mobile device to satellite transceiver and downlink from the satellite transceiver to the mobile device operate in a designated satellite band. In areas where terrestrial base stations operate, either some or all of the satellite downlink spectrum is used by the terrestrial base stations to provide downlink (i.e., downlink from the base station to the mobile device). Since the terrestrial signals are order of magnitude stronger in the coverage area, the stronger terrestrial signals will "override" the satellite downlink signals. In the uplink direction, the OOB spectrum is used in the terrestrial uplink (i.e., uplink from the mobile device to the base station) with substantially no effect on satellite operation as the OOB uplink spectrum is outside the "normal" satellite uplink spectrum.

Figure 2C:
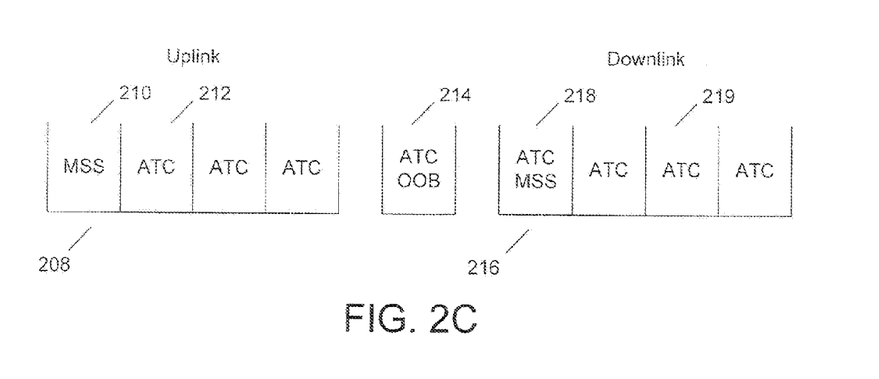
FIG. 2C illustrates an allocation of channels in a spot beam with the addition of out of band spectrum in an MSS/ATC system, according to another embodiment of the present invention.

FIG. 2C illustrates an allocation of channels in a spot beam with the addition an out of band channel in an MSS/ATC system, according to another embodiment of the present invention. As shown in FIG. 2B, there are a plurality of data transmission uplink channels 208. In accordance with the MSS/ATC standard, one or more channels may be used as either a satellite (e.g., MSS) channel or a terrestrial (e.g., ATC) channel. For example, in one embodiment, one uplink channel 210 can be used as a MSS uplink channel (i.e., mobile device to satellite communication channels). The remaining channels 212 can be used as uplink terrestrial channels (i.e., mobile device to base station communication channels), for example, in ATC channels.

Furthermore, FIG. 2C shows modified data transmission links 216 in accordance with the co-channel reuse and out of band techniques described herein. The modified data transmission downlinks 216 can comprise a MSS/ATC dual downlink channel 218 in addition to the normal downlink terrestrial channels 219 (i.e., base station to mobile device communication channels) which are paired with uplink terrestrial channels 212 (i.e., mobile device to base station communication channels). The MSS/ATC dual downlink channel 218 allows both the satellite transceiver 102 and base stations 104 to communicate to mobile devices 106 on the same channel. Similar to the embodiment described above with respect to FIG. 2B, the satellite transmission will not interfere with the base station transmission on the same frequency because the base station signal is orders of magnitude stronger than the satellite signal.

The uplink channel corresponding to base station to mobile device downlink channel in dual downlink channel 218 is handled differently. As shown in FIG. 2C, a terrestrial out-of-band (OOB) uplink channel 214 is added to the data transmission uplink channels 208. For example, an ATC OOB uplink channel 214 is added to the data transmission links

208. This terrestrial out-of-band uplink channel (e.g., ATC OOB uplink channel) 214 allows a mobile device 106 to communicate with a base station 104 without interfering with reception by the satellite transceiver 102. The terrestrial out-of-band uplink channel (e.g., ATC OOB uplink channel) 214 together with the terrestrial downlink channel (e.g., ATC downlink channel) 218 form a terrestrial channel pair (e.g., an ATC channel pair) permitting communications between base station and mobile device.

The OOB spectrum is a portion of spectrum which may be equal to the spectrum allocation of any channel transmitted in the data transmission link. The same OOB spectrum can be used for any spot beam from a satellite transceiver using any channel. Preferably, the OOB spectrum may include any spectrum with adequate propagation characteristics for mobile or portable use.

Interference is mitigated because the OOB channel is not seen by the satellite transceiver. That is, the OOB channel is out of the satellite transceiver band pass.

The schemes described above improve the spectral efficiency. For example, referring to the embodiment illustrated in FIG. 2C, with convention MSS/ATC communications a spot beam would normally allow three of the four channels, for example, to be used for terrestrial data communications. Thus, one-fourth of the channels would not be available for terrestrial communications. The additional use of an MSS downlink channel for satellite to mobile device transmissions coupled with a mobile device to base station uplink in additional OOB spectrum outside the pre-assigned spectrum portion for satellite communications enables an increase in spectral efficiency. That is, another channel pair is now available for terrestrial data transmission.

For example, referring to the embodiment illustrated in FIG. 2C, if the MSS or ATC uplink and downlink channels each occupy 20 MHZ of bandwidth and the terrestrial OOB uplink (ATC OOB) channel occupies a 5 MHZ portion of terrestrial, unpaired spectrum, the efficiency of an MSS/ATC system may be increased by 12%. In other words, 45 MHZ of allocated spectrum gives rise to 50 MHZ of effective spectrum.

Similarly, referring to the embodiment illustrated in FIG. 2B, in the downlink direction, each of the four downlink channels is used for both communications from satellite to mobile device (downlink S channels) and from base station to mobile device (downlink T channels). In the uplink direction, each of the four uplink channels is used for communication between the mobile device and the satellite. The uplink communication between the mobile device and the base station is handled using the four OOB uplink channels to prevent interference with the satellite uplink channels. So, there is a total of 8 uplink channels. Normally, in the downlink direction there would be also 8 counterpart downlink channels, i.e., 4 downlink channels for communication between the satellite and the mobile device (S downlink channels) and 4 downlink channels for communication between the base station and the mobile device (T downlink channels) giving rise to a total of 16 satellite and terrestrial channels. However, because the signal from the base station is orders of magnitude stronger than the satellite signal, the terrestrial signal would override the satellite signal. Therefore, the 4 downlink channels for communication between the satellite and the mobile device (S downlink channels) and 4 downlink channels for communication between the base station and the mobile device (T downlink channels) can be combined or merged such that each S downlink channel and a corresponding T downlink channel uses the same frequency band. As a result, in the downlink direction, only 4 downlink channels are used instead of the normal 8 channels, in this example.

Therefore, if each of the uplink and downlink channels and each of the OOB uplink channels occupies a same bandwidth, for example, 5 MHZ of bandwidth, the efficiency of a satellite-terrestrial system may be increased by 25% (i.e., 4 channels divided by a total of 16 channels).

The OOB spectrum application may be applied to a terrestrial implementation of overlay base station sites and underlay base station sites. Overlay base station sites may include any site used for broad coverage, for example, a site located at a higher elevation. Underlay base station sites may include any sites used to fill in coverage and capacity at least partially within the coverage of the overlay site, for example, sites located at a lower elevation relative to the overlay site. The OOB spectrum application may allow co-channel use of the same downlink channel for both the underlay base station-to-mobile device communications link and the overlay base station-to-mobile device communications link. Interference is avoided on the uplink side by using the OOB spectrum for the mobile device-to-underlay terrestrial base station communication uplink.

This implementation can avoid regulatory hurdles associated with ATC as the terrestrial implementation will have no negative effect on satellite operations. Furthermore, this implementation can also offer an alternative method of implementing a terrestrial component in a satellite based communication system.

Figure 3:
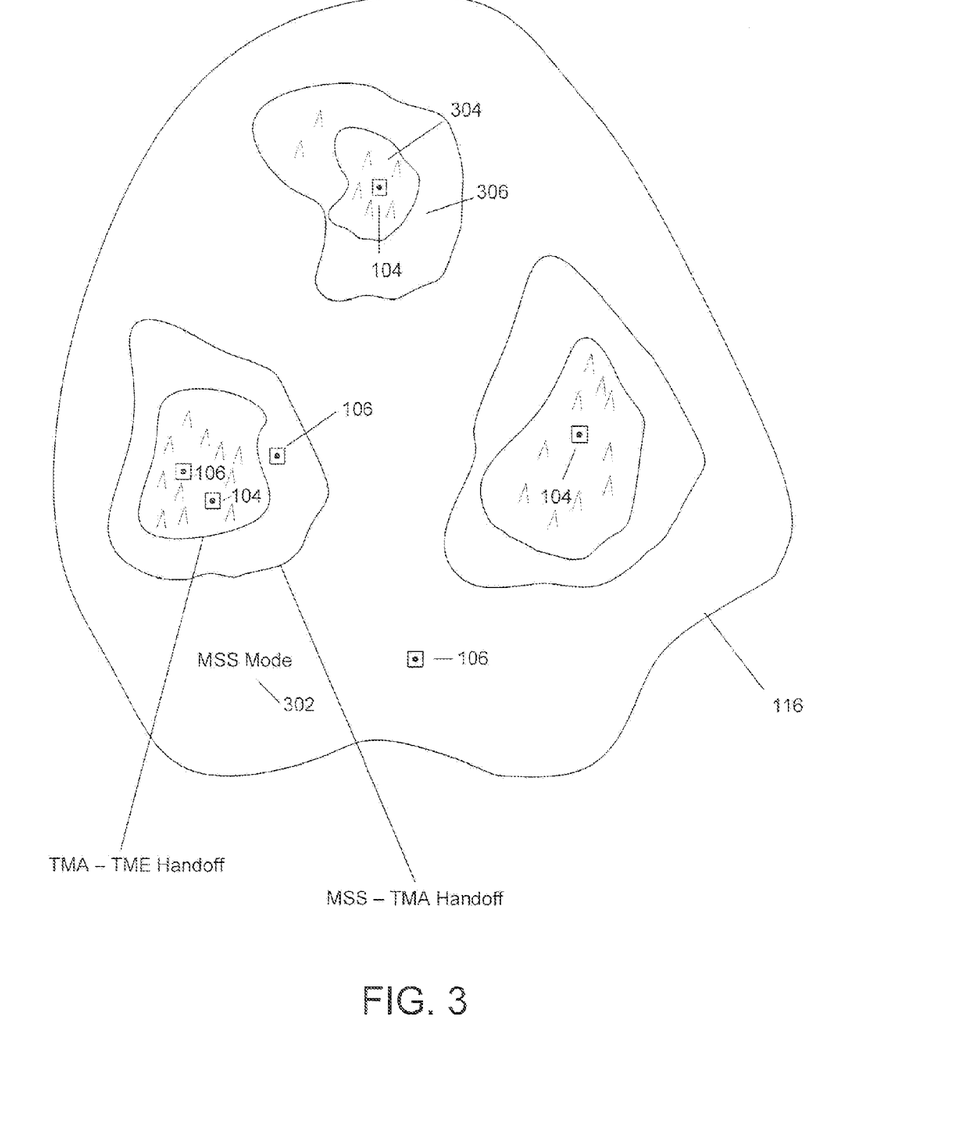
FIG. 3 illustrates hand-off boundaries between Mobile Satellite System (MSS) mode, Terrestrial Mode ATC (TMA) mode and Terrestrial Mode Enhanced (TME) mode according to an embodiment of the present invention.

FIG. 3 illustrates hand off boundaries between Mobile Satellite System (MSS) mode, Terrestrial Mode ATC (TMA) mode and Terrestrial Mode Enhanced (TME) mode, according to an embodiment of the present invention.

As shown in FIG. 3, a spot beam 116 illuminates an area that that encompasses a mobile device 106. Within this area, there are three communication modes in which the satellite transceiver 102 may communicate bi-directionally with the mobile devices 106. Similarly, in some of this area, the base stations 104 may communicate bi-directionally with the mobile devices 106.

The MSS mode region 302 is the region where the mobile devices 106 may communicate bi-directionally with the satellite transceiver 102. In MSS mode region 302, the mobile devices 106 are out of range of base stations 104. The TMA mode region 306 and the TME mode region 304 are regions where the mobile devices 106 can communicate with either base stations 104 or satellite transceivers 102. Further, FIG. 3 shows the various boundaries at which the mobile devices 106 are handed off between modes.

MSS mode refers to the mode where a mobile device 106 is communicating via a satellite transceiver 102 on a portion of the radio spectrum assigned for satellite transceiver 102 communications (i.e. MSS communication downlink and uplink) in accordance with the conventional MSS standard. MSS mode may be employed where terrestrial communications with a base station 104 is not possible. Channels employed for adjacent satellite spot beams 116 are governed by conventional rules to avoid adjacent spot beam interference.

TMA mode refers to the mode where a mobile device 106 is communicating via a terrestrial base station 104 within a spot beam 116 of a satellite transceiver 102. The spectrum is assigned for both terrestrial base stations-to-mobile device communication links and mobile device-to-terrestrial base station communication links employing conventional MSS/ATC standards. For example, a channel is assigned for satellite communications and remaining channels can be used for terrestrial communications, as depicted in FIG. 2A.

TME mode refers to the mode where a mobile device 106 is communicating via a terrestrial base station 104 using the spectrum assigned using the conventional MSS/ATC standards, the spectrum assigned for the MSS communication link for an additional terrestrial base station-to-mobile device communication link and the out of band spectrum that is not part of the portion of spectrum assigned to the MSS communication link for an additional mobile device-to-base station communication link.

TMA mode regions 306 between TME mode regions 304 and MSS mode regions 302 cause mobile devices 106 which may have been receiving communications from base station 104 using a channel shared with a downlink from the satellite transceiver in TME mode regions 304 to switch to a channel not used for satellite communications in accordance with the MSS/ATC standard before the mobile devices 106 enter the MSS mode regions 302. Here, it is assumed that TMA mode coverage is greater than TME mode coverage. That is, TME mode allows the utilization of more channels. In this case, TMA covers any given geographical area which is covered by TME.

Mitigation of interference in the TME mode can be achieved by using different multiplexing schemes for the base station-to-mobile device link and the satellite-to-mobile device link that share the same channel. For example, a wideband code division multiple access (CDMA) signal can be used in the terrestrial base stations-to-mobile device communication link. The satellite-to-mobile device communications link can employ orthogonal frequency division multiplexing (OFDM). Of course, many other variations are possible. If a channel is subdivided into multiple portions, the wide-band CDMA signal will appear as a narrow band signal with weak signal strength and will be rejected by the CDMA system gain discriminator. As a result, any degradation on the communication link is minimal.

In general, in transitional areas between terrestrial operations and satellite operations, several methods may be used to achieve an interference free or minimize interference in a hand over between the terrestrial and satellite systems. For example, if the individual channel bandwidths on the satellite and ground systems are similar, a portion of the satellite downlink spectrum can be eliminated from use in outer coverage areas of the terrestrial system so as to offer a co-channel interference free channel for handoff between the satellite and terrestrial systems in those transitional areas where terrestrial service ends and satellite-only service begins.

However, the bandwidth of the individual channels used on the satellite can also be narrower than the bandwidth of a channel used on a terrestrial network. For example, this may be the case when the MSS system uses modified Global System for Mobile communications (GSM) channels and the terrestrial network uses Universal Mobile Telecommunications System (UMTS) or Worldwide Interoperability for Microwave Access (WiMax), or other 3G or 4G broadband transmission technologies. If the bandwidth of the individual channels used on the satellite are narrower than a bandwidth of channel in the terrestrial network, the difference in energy density per Hz between the wide terrestrial channels and the narrow satellite channels can be exploited as an interference protection between terrestrial operations and satellite operations. Indeed, at an edge of terrestrial coverage, terrestrial signals may have less energy than near the base station. In addition, the bandwidth of the terrestrial channels being broader than the bandwidth of the satellite system, the result is that the energy density per Hz for the terrestrial system is smaller than the energy density per Hz for the satellite system. Hence, at the transitional area, the mobile device would "see" the satellite transmission system and would drop the terrestrial transmission system as the energy density of the terrestrial transmission system is smaller than the energy density in the satellite transmission system. This minimizes or substantially eliminates interference between the satellite and terrestrial transmission systems at the transitional areas.

Figure 4:
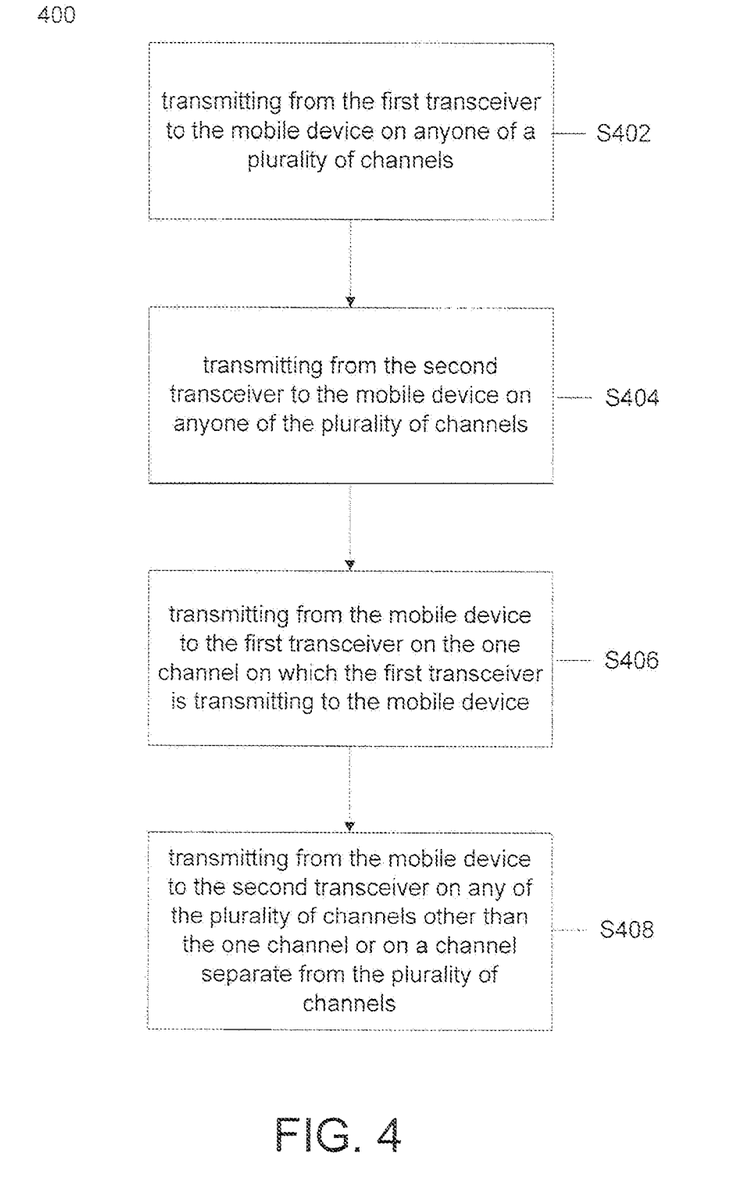
FIG. 4 illustrates a flow chart describing a method for communicating between a mobile device with plural transceivers according to an embodiment of the present invention.

FIG. 4 illustrates a flow chart 400 describing a method for communicating between a mobile device 106 with plural transceivers according to an embodiment of the present invention. A second transceiver may be positioned in an area covered by a first transceiver. Further, in this embodiment, a first signal is received by the mobile device from the first transceiver which has a lower energy than a second signal received by the mobile device from the second transceiver.

The first transceiver transmits to the mobile device on any one of a plurality of channels (S402). Next, a second transceiver transmits to the mobile device 106 on any one of the plurality of channels (S404). In turn, the mobile device 106 transmits to the first transceiver on the one channel on which the first transceiver is transmitting to the mobile device 106 (S406). Lastly, the mobile device 106 transmits to the second transceiver on any of the plurality of channels other than the one channel or on a channel separate from the plurality of channels (S408).

The first transceiver can be a satellite transceiver 102. Additionally, the second transceiver can be a base station 104. In one embodiment, any one of the plurality of channels other than the one channel may be an Auxiliary Terrestrial Component (ATC) channel having a spectrum equal to the spectrum allocation of any of the plurality of channels other than the one channel. In another embodiment, anyone of a plurality of channels used in a transmission from the first transceiver or from the second transceiver may be configured to be both a Mobile Satellite System (MSS) channel and an Auxiliary Terrestrial Component (ATC) channel.

It will be understood by those of ordinary skill in the art that various replacements, modifications and changes may be made in the form and details without departing from the spirit and scope of the present invention as defined by the following claims. Therefore, it is to be appreciated that the above described embodiments are for purpose of illustration only and are not to be construed as limitations of the invention.

What is claimed is:

1. A method for communicating between a mobile device, first and second transceivers wherein the second transceiver is positioned in an area covered by the first transceiver, wherein a first signal received by the mobile device from the first transceiver has lower energy than a second signal received by the mobile device from the second transceiver, the method comprising:

transmitting from the first transceiver to the mobile device on any one of a plurality of channels; and transmitting from the second transceiver to the mobile device on any one of the plurality of channels, the plurality of channels including the one channel on which the first transceiver is transmitting.

2. The method of claim 1, further comprising:

transmitting from the mobile device to the first transceiver on the one channel on which the first transceiver is transmitting to the mobile device; and transmitting from the mobile device to the second transceiver on any of the plurality of channels other than the one channel or on a channel separate from the plurality of channels.

3. The method of claim 1, wherein the first transceiver is a satellite transceiver.

4. The method of claim 1, wherein the second transceiver is a base station.

5. The method of claim 1, wherein any one of the plurality of channels other than the one channel is an Auxiliary Terrestrial Component (ATC) channel.

6. The method of claim 1, wherein each of the plurality of channels is configured to be both a satellite channel for communications from a satellite to the mobile device and a terrestrial channel for communication from a base station to the mobile device.

7. The method of claim 6, further comprising:
transmitting from the mobile device to the satellite on the satellite channel, and transmitting from the mobile device to the base station on a channel separate from the plurality of channels.

8. The method of claim 7, wherein the channel separate from the plurality of channels is one channel in a plurality of terrestrial out-of-band (OOB) channels.

9. The method of claim 8, further comprising pairing each of the plurality of terrestrial out-of-band channels with a respective terrestrial channel in the plurality of channels.

10. The method of claim 1, further comprising:
transmitting from the mobile device to the first transceiver on any one of the plurality of channels; and
transmitting from the mobile device to a second transceiver on any of the plurality of channels other than the one channel or on a channel separate from the plurality of channels.

11. The method of claim 10, wherein the first transceiver is a satellite transceiver.

12. The method of claim 10, wherein the second transceiver is a base station.

13. The method of claim 10, wherein any one of the plurality of channels other than the one channel is an Auxiliary Terrestrial Component (ATC) channel.

14. The method of claim 10, wherein transmitting from the mobile device to the first transceiver on any one of a plurality of channels comprises transmitting from the mobile device to a satellite on a satellite channel in the plurality of channels.

15. The method of claim 10, wherein transmitting from the mobile device to the second transceiver comprises transmitting from the mobile device to a base station on a channel separate from the plurality of channels.

16. The method of claim 15, wherein the channel separate from the plurality of channels is one channel in a plurality of terrestrial out-of-band (OOB) channels.

17. The method of claim 16, wherein the terrestrial out-of-band channels are Auxiliary Terrestrial Component (ATC) channels.

18. The method of claim 16, further comprising pairing each of the plurality of terrestrial out-of-band (OOB) channels with a respective terrestrial channel in the plurality of channels.

19. An apparatus for communicating with a mobile device, the apparatus comprising:
a first transceiver which transmits to the mobile device on any one of a plurality of channels; and
a second transceiver which transmits to the mobile device on any one of the plurality of channels, the plurality of channels including the one channel on which the first transceiver is transmitting, wherein the second transceiver is positioned in an area covered by the first transceiver, and wherein a first signal received by the mobile device from the first transceiver has lower energy than a second signal received by the mobile device from the second transceiver.

20. The apparatus of claim 19, further comprising the mobile device, wherein the mobile device transmits to the first transceiver on the one channel on which the first transceiver is transmitting to the mobile device, and transmits to the second transceiver on any of the plurality of channels other than the one channel or on a channel separate from the plurality of channels.

21. The apparatus of claim 19, wherein the first transceiver is a satellite transceiver.

22. The apparatus of claim 19, wherein the second transceiver is a base station.

23. The apparatus of claim 19, wherein any one of the plurality of channels other than the one channel is an Auxiliary Terrestrial Component (ATC) channel.

24. The apparatus of claim 19, wherein each of the plurality of channels is configured to be both a satellite channel for communications from a satellite to the mobile device and a terrestrial channel for communication from a base station to the mobile device.

25. The apparatus of claim 24, wherein the mobile device is configured to transmit to the satellite on the satellite channel, and to transmit to the base station on a channel separate from the plurality of channels.

26. The apparatus of claim 25, wherein the channel separate from the plurality of channels is one channel in a plurality of terrestrial out-of-band (OOB) channels.

27. The apparatus of claim 26, wherein each of the plurality of terrestrial out-of-band (OOB) channels is paired with a respective terrestrial channel in the plurality of channels.

28. The apparatus of claim 19, further comprising the mobile device, wherein
the mobile device transmits to a first transceiver on any one of a plurality of channels, and transmits to a second transceiver on any of the plurality of channels other than the one channel or on a channel separate from the plurality of channels.

29. The apparatus of claim 28, wherein any one of the plurality of channels other than the one channel is an Auxiliary Terrestrial Component (ATC) channel.

30. The apparatus of claim 28, wherein the first transceiver is a satellite transceiver and the second transceiver is a base station, wherein the mobile device is configured to transmit to the satellite transceiver on any one of a plurality of satellite channels and configured to transmit to the base station on a channel in a plurality of terrestrial out-of-band channels separate from the satellite channels.

* * * * *